Feb. 12, 1924.
C. W. POTTER
1,483,833
SANITARY SPOON AND LADLE HOLDER
Filed Feb. 8, 1923
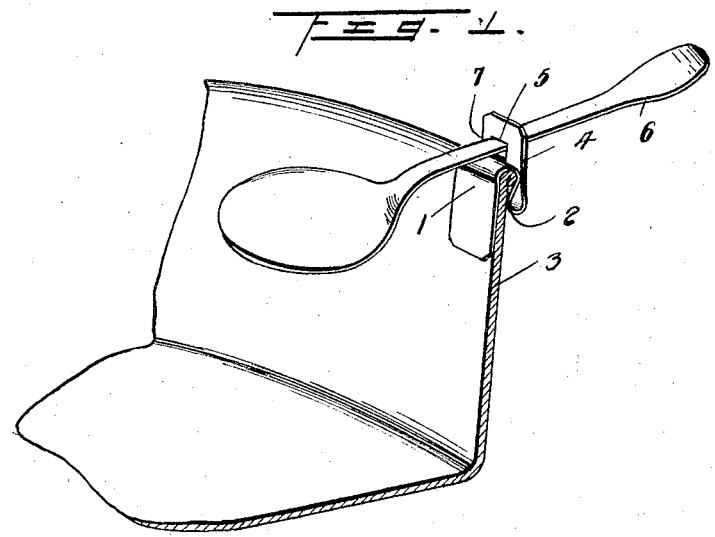
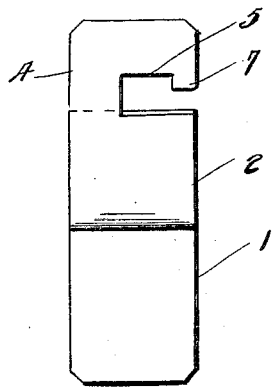
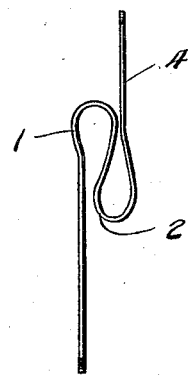
Inventor
C. W. Potter.

Patented Feb. 12, 1924.

1,483,833

UNITED STATES PATENT OFFICE.

CHARLES W. POTTER, OF RISING SUN, INDIANA.

SANITARY SPOON AND LADLE HOLDER.

Application filed February 8, 1923. Serial No. 617,729.

*To all whom it may concern:*

Be it known that I, CHARLES W. POTTER, a citizen of the United States, residing at Rising Sun, in the County of Ohio and State of Indiana, have invented certain new and useful Improvements in Sanitary Spoon and Ladle Holders; and I do hereby declare the following to be a full, clear, and exact description of the invention, such as will enable others skilled in the art to which it appertains to make and use the same.

In the preparation of food it is common to use a spoon or ladle in the pot or other utensil in which the food is being prepared. It is not advisable to leave the spoon or ladle in the contents of the pot during the cooking process and neither is it always convenient to remove the spoon or ladle because of dripping of the food adhering thereto. Hence the present invention has for its object the provision of a device which may be applied to the upper edge of the pot and which engages and holds the spoon or ladle clear of the contents and which will not interfere with placing of the cover in position upon the pot so as to confine the heat and steam and otherwise protect the contents from insects and dust.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a perspective view illustrating the application of the invention,

Figure 2 is a rear view of the holder, and

Figure 3 is a side view thereof.

Corresponding and like parts are referred to in the following description and designated in the several views of the drawings by like reference characters.

The device comprises a spring clip adapted to engage over the upper edge of a pot or other vessel in which food is prepared and cooked, and a retainer to engage the handle of the spoon, ladle or like implement, the clip and retainer preferably constituting parts of a single blank, such as a strip of metal bent into the form substantially as shown in the accompanying drawings, and the retainer having a lateral slot opening through an edge thereof to receive the handle of the spoon and having a stop at the entrance of the slot to prevent lateral displacement of the spoon or other implement when in engagement with the holder.

The spring clip comprises an inner jaw 1 and an outer jaw 2 and these jaws are so related as to embrace the upper edge portion of a pot 3 or other utensil in which the food is prepared and cooked. The jaw 1 is preferably straight, whereas the jaw 2, which is of less length than the jaw 1, is formed on a compound curve so as to clear the rim at the upper edge of the pot 3 and grip the sides of the pot a short distance below the rim, whereby to retain the holder in place when applied to the pot or analogous utensil.

The retainer 4 consists of an arm which is disposed outwardly from the rim and projects above the same an appreciable distance. A lateral slot 5 is formed in the upper portion of the arm 4 and opens through an edge thereof to facilitate the entrance and removal of the spoon 6 or like implement when placing the same in position or removing it from the holder. A stop 7 is provided at the entrance of the lateral slot 5 and is preferably disposed at the top thereof so as to engage the handle of the spoon and prevent lateral displacement thereof. When the spoon 6 is in position, it rests upon the top of the spring clip and the bowl portion being heavier operates to elevate the handle portion and hold it in the path of the stop 7, which latter prevents lateral displacement of the spoon as will be readily understood. The retainer 4 being disposed outwardly from the clip does not interfere with the cover of the pot which may be placed in position in the usual way.

What is claimed is:

A holder of the class described in a single blank comprising a spring clip, a retainer returned from and disposed outwardly from and projecting above the clip, said retainer being provided with a lateral receiving slot open at a side edge thereof adjacent the top of the clip, and the retainer having a depending stop at the entrance of the slot to prevent lateral displacement of the implement when in engagement with the holder.

In testimony whereof I affix my signature in presence of two witnesses.

CHARLES W. POTTER.

Witnesses:
 MAE RICKETTS,
 JENNIE WILLIAMSON.